United States Patent [19]

Pelly et al.

[11] 3,728,557

[45] Apr. 17, 1973

[54] CONTROL SCHEME FOR TIMING THE APPLICATION OF LIMITED DURATION FIRING SIGNALS TO POWER SWITCHING DEVICES

[75] Inventors: Brian R. Pelly, Murrysville; Mario G. Tarjan, Pittsburgh, both of Pa.

[73] Assignee: Westinghouse Electric Corporation, Pittsburgh, Pa.

[22] Filed: Jan. 20, 1972

[21] Appl. No.: 219,461

[52] U.S. Cl. ..........307/252 N, 307/252 UA, 321/13, 321/40

[51] Int. Cl. ..........H03k 17/56

[58] Field of Search ..........307/252 N, 252 Q, 307/252 T, 252 JA; 321/13, 38, 40

[56] References Cited

UNITED STATES PATENTS

| | | | |
|---|---|---|---|
| 3,462,619 | 8/1969 | Grees et al | 307/252 Q |
| 3,654,541 | 4/1972 | Kelly, Jr. et al. | 321/13 |
| 3,681,676 | 8/1972 | Bourbeau | 321/13 X |

*Primary Examiner*—John Zazworsky
*Attorney*—F. H. Henson et al.

[57] ABSTRACT

The invention relates to a technique for monitoring the forward and reverse voltage conditions across power switching devices and applying limited duration firing signals to the power switching devices during the forward blocking voltage conditions.

4 Claims, 3 Drawing Figures

CONTROL SCHEME FOR TIMING THE APPLICATION OF LIMITED DURATION FIRING SIGNALS TO POWER SWITCHING DEVICES

BACKGROUND OF THE INVENTION

In present day high voltage DC mercury arc converters, it is common practice for the grid firing pulse to be applied for the full intended conduction period of the switching device. This means, for example, in a three-phase bridge converter, the grid pulse would normally have a duration of 120°. The use of this full duration firing pulse insures correct operation of the high voltage converter under all conditions. Normally, with continuous conduction through the bridge, each switch actually requires only a relatively short firing pulse at the instant of turn-on, and most of the full duration firing pulse is superfluous. Under certain transient conditions, however, portions of the full duration firing pulse other than the leading edge may actuate the switch. For example, it is possible for the leading edge of the pulse to be applied inadvertently at a point at which the switch is not ready to conduct, i.e., it still has reverse anode voltage across it. In this situation, since the grid pulse is continuous, the switch conducts as soon as its anode voltage becomes positive and the effects of the original error in the timing of the firing pulse are not noticed by the power system.

Again, under certain conditions, the current waveform at the dc terminals of the converter may be discontinuous, and each switch may carry two or more discrete portions of current during a single 120° period. For each start-up of current, the switch is automatically actuated due to the presence of the continuous firing pulse.

In a thyristor high voltage DC converter however, in which many thyristors are connected in series in each leg of the converter circuit, two disadvantages of a continuous firing pulse are the following:

1. There are practical difficulties associated with supplying a continuous firing pulse having a fast rise time to each of many series connected thyristors. If a short firing pulse could be utilized, the design of the firing circuits could be considerably simplified.
2. The necessity for an extended or full duration firing pulse implies that it is sometimes required to gate or fire the thyristors of the converter leg with a part of the firing pulse other than the leading edge. This in turn implies that for certain periods of time the firing pulse would be applied with reverse voltage present across the leg. For a mercury arc valve this condition is tolerable. For a thyristor, the application of gate drive with reverse anode voltage results in a considerable increase in the reverse leakage current. Although for a single thyristor this in itself may not be serious, in the case of a plurality of thyristors connected in series the possibility exists for the reverse blocking impedance of some thyristor to be effected to a much greater extent than that of others. A probable consequence is an uneven distribution of voltage across the series connected thyristors, which would likely lead to a chain reaction breakdown effect and an eventual catastrophic reverse failure of all the thyristors.

SUMMARY OF THE INVENTION

The essence of the invention as exemplified in the disclosure is the utilization of control circuitry to monitor the forward blocking voltage conditions across the series connected thyristors forming a leg of a converter and to selectively apply limited duration firing pulses to the thyristors only at those instants during the "-prescribed conduction" interval and when a forward blocking voltage condition is developed. An output signal from the control circuitry indicative of the presence of a new forward voltage condition functions to gate the signal representing the conventional full duration firing pulse for application to the thyristors. Assuming the situation where the forward voltage drop condition across the thyristors comprising a convertor leg continues uninterrupted for the entire prescribed conduction period, the control circuitry would function to provide a single limited duration firing pulse at the outset of the conduction period which would be sufficient to initiate turn-on of the thyristors. If, however, the forward voltage drop condition was intermittent throughout the prescribed conduction period resulting in periods of reverse voltage drop during which the conduction of the thyristors would be terminated, the control circuitry would function to apply additional short duration firing pulses following termination of reverse voltage conditions and the subsequent development of a forward voltage condition.

While the converter embodiment has been chosen to illustrate the invention through the use of one particular circuit arrangement it is apparent that numerous circuit arrangements are available and the utilization of the invention extends to all types of static equipment, such as, frequency changers, A-C regulators, static circuit breakers, transformer top changers, etc.

The invention will become more readily apparent from the following exemplary description in connection with the accompanying drawings.

DESCRIPTION OF THE PREFERRED EMBODIMENT

Figure 1:
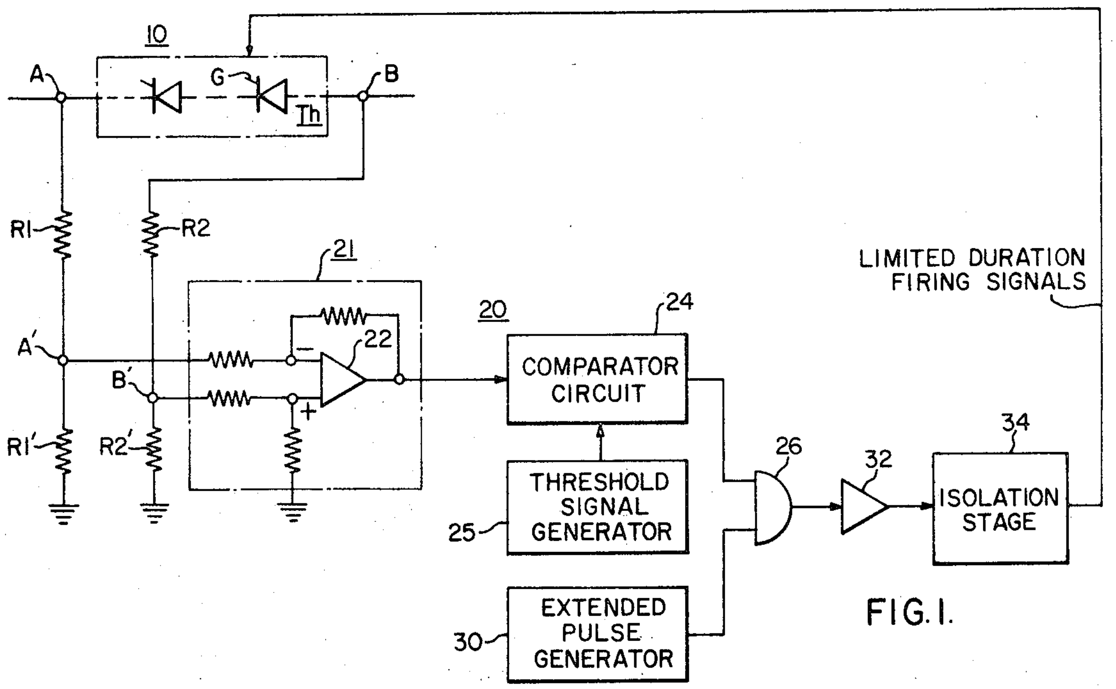
FIG. 1 is a schematic illustration of an embodiment of the invention.

Referring to the embodiment of FIG. 1 there is illustrated schematically a typical converter leg 10 of a high voltage DC converter comprised of a plurality of series connected gate controlled power switching devices Th and a control circuit 20 for monitoring the forward and reverse voltage conditions across the converter leg 10 as measured between points A and B and for producing limit duration firing signals for application to the gate electrodes G of the power switching devices Th.

A resistive potential divider circuit consisting of resistors R1 and R1′ is connected between point A of the converter leg 10 and ground, while a resistive potential divider circuit consisting of resistors R2 and R2′ is connected between point B of the converter leg and ground. The resistance value of resistors R1 and R2 is substantially greater than the resistance value of resistors R1' and R2', thus resulting in a low voltage representation of the voltage between points A and B at points A' and B'. The voltage levels developed at points A' and B' are applied to differential amplifier circuit 21 with the voltage appearing at point A' being applied to the negative input terminal of differential amplifier 22 and the voltage appearing at point B' is being applied to the positive input terminal of the differential amplifier 22. In the configuration as shown a forward blocking voltage condition exists when point B of the converter leg is positive with respect to point A. This condition which results in a positive output from differential amplifier 22 which is indicative of the forward blocking voltage condition. It is apparent that by reversing the connections to the converter leg or the inputs to the differential amplifier that a negative output signal from the differential amplifier 22 would be indicative of a forward blocking voltage condition. Furthermore, while the circuit operation is described in response to a signal indicative of the forward blocking voltage condition across the converter leg 10 it is apparent that the circuitry can be modified readily to provide the desired limited duration firing pulses in response to signal indicative of reverse blocking voltage and forward conduction voltage conditions.

The output signals of the differential amplifier 22 are applied as a first input to comparator circuit 24. The comparator circuit 24 compares the input signal derived from differential amplifier 22 to a positive threshold signal supplied by a threshold generator circuit 25 as a second input to the comparator circuit 24 and generates a logic one output when the first input signal equals or exceeds the positive threshold input signal and produces a logic zero output when the first input signal is less than the positive threshold input signal. The positive threshold input signal, which may typically be the output of a power supply, establishes a minimum positive value required before a logic one output is generated by a comparator circuit 24. This positive threshold provides immunity to spurious indications of the presence of forward blocking voltage during the forward conduction period of the power switches Th of the converter leg 10. The logic output signal from the converter circuit 24 is in turn applied as a first input to a dual input AND gate 26. The second input to the AND gate 26 is provided by a conventional extended pulse generator 30 which provides a logic signal representing the "intended" or "prescribed" conduction period of the power switches of a converter leg 10, e.g. in the case of a three-phase converter circuit this signal would have a duration of 120°. A typical impremention of an extended pulse generator is described and illustrated in the text THYRISTOR-PHASE CONTROLLED CONVERTERS AND CYCLOCONVERTERS by B. R. Pelly published by Wiley-Interscience, 1971 (see pages 248–254). The simultaneous presence of an output pulse from the extended pulse generator 30 and a logic one output from the comparator circuit 24 results in the gating of an output signal from AND gate 26 corresponding to a portion of the extended pulse generator output pulse which is subsequently amplified by amplifier circuit 32, supplied through isolation stage 24 and applied as a limited duration firing pulse to the gates G of a power switches Th of the converter leg 10.

Figure 2:
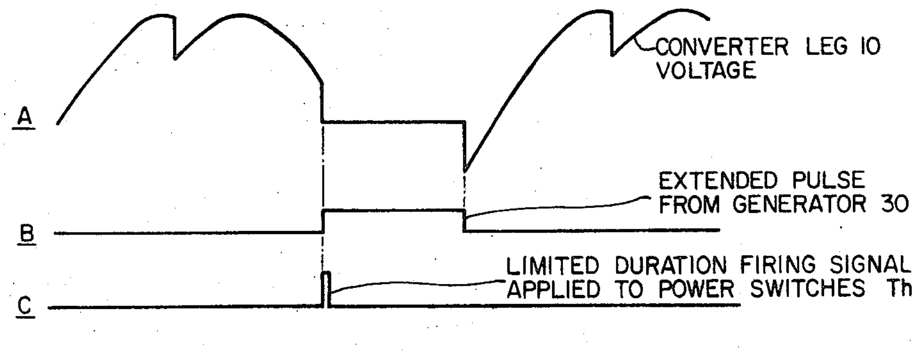
FIG. 2, A B and C are waveforms illustrations of the operation of the embodiment of FIG. 1.
Figure 3:
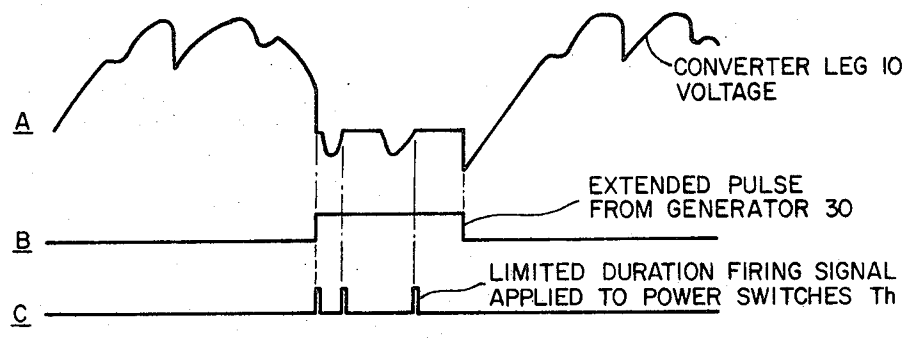
FIG. 3,A, B and C are waveforms illustrations of the operation of the embodiment of FIG. 1 under a second set of operating conditions.

The operation of a control circuit 20 is illustrated in simplified form by the waveforms A, B and C of FIG. 2. Waveform A illustrates the converter leg voltage as monitored between points B and A in FIG. 1 while waveform B illustrates the extended pulse produced by the extended pulse generator 30 during a full conduction period of the power switches Th of the converter leg 10. Waveform C illustrates the limited duration firing pulse produced in response to the simultaneous presence of a forward blocking voltage condition across the converter leg 10 which results in a logic one output from the comparator circuit 24 and the presence of the output pulse from the extended pulse generator 30. The waveform A illustrates an ideal situation wherein the thyristors Th are maintained in continuous conduction for the entire designated period of conduction i.e., 120° for a three-phase converter. The waveform A of FIG. 3 depicts the situation where following the initial firing of the power switches Th by a limited duration firing pulse the power switches are subjected to reverse blocking voltage condition. The absence of a firing pulse during this condition provides for the power switches. The power switches are returned to the conductive state only when a forward blocking voltage condition exists and the resulting logic one output signal from the comparator circuit 24 causes a subsequent limited duration firing pulse to be applied to the gate electrodes G of the power switches Th. 37 2

The duration of the firing pulse is limited due to the fact that following the firing of the power switches the forward voltage monitored between points A and B essentially drops to zero thereby resulting in an input signal to the comparator circuit 24 from the differential amplifier circuit 22 which is insufficient to produce a logic one output from the comparator circuit 24. The control circuit 20 therefore provides not only initial firing of the power switching devices of a converter leg at the initial appearance of a forward blocking voltage condition across the leg and the presence of an extended pulse from the pulse generator 30 but also provides for repeated firing the power switches during the conduction period following discontinuities in the forward blocking voltage condition.

The practical effect of providing limited duration firing pulses initially and throughout the predetermined conduction period as required is that the same operational characteristics are achieved as are normally provided by the conventional full duration firing pulse while preventing application of firing pulses to the power switching devices under reverse blocking voltage conditions.

We claim:

1. In an electrical apparatus including one or more gate controlled ON-OFF power switching devices operatively connected to a voltage source and firing signal control circuit means operatively connected to said gate controlled ON-OFF power switching devices to provide firing signals for a period of time representing a prescribed period of conduction of the ON-OFF power switching devices, the improvement for limiting the firing signals applied to the gate controlled ON-OFF power switching devices to a time less than the prescribed conduction period and further limiting the application of firing signals to a time when forward blocking voltage conditions exists across the ON-OFF power switching devices;

said improvement comprising means for monitoring the voltage conditions across said ON-OFF power switching devices and producing an output signal indicative of forward blocking voltage condition, second circuit means having a first input operatively connected to the output of said first circuit means and a second input operatively connected to the output of said firing signal control circuit means;

said second circuit means supplying a limited duration firing signal to the gate controlled ON-OFF power switching devices in response to the simultaneous presence of a signal indicative of forward blocking voltage conditions at said first input and a firing signal at said second input, the duration of said limited duration firing signal being substantially the time required to establish said ON-OFF power switching devices in an ON conductive state thereby reducing said forward blocking voltage condition essentially to zero.

2. In an electrical apparatus as claimed in claim 1 wherein said first circuit means includes a voltage difference detector circuit means operatively connected to said ON-OFF power switching devices and producing a first polarity output signal in response to said forward blocking voltage condition and a second polarity output signal in response to a reverse blocking voltage condition, a comparator circuit means having a first input operatively connected to the output of said voltage difference detection circuit means and means for applying a threshold signal indicative of said forward blocking voltage condition to a second input of said comparator circuit means, said comparator circuit means providing said input signal to said first input of said second circuit means when a first output signal from said voltage difference detector circuit means satisfies a predetermined relationship with said threshold signal.

3. In an electrical power converter apparatus including converter legs having one or more gate controlled ON-OFF power switching devices operatively connecting an input voltage source to an electrical load and firing signal control circuit means operatively connected to said gate controlled ON-OFF power switching devices of each converter leg to sequentially provide firing signals for a period of time representing a prescribed period of conduction of each converter leg, the improvement for limiting the firing signals applied to the gate controlled ON-OFF power switching devices to a time less than the prescribed conduction period and further limiting the application of firing signals to a time when a forward blocking voltage condition exists across the converter leg;

said improvement comprising means for monitoring the voltage conditions of each converter leg and producing an output signal indicative of said forward blocking voltage condition, second circuit means having a first input operatively connected to the output of said first circuit means and a second input operatively connected to the output of said firing signal control circuit means;

said second circuit means supplying a limited duration firing signal to the gate controlled ON-OFF power switching devices of said converter leg in response to simultaneous presence of a signal indicative of said forward blocking voltage condition at said first input and a firing signal at said second input, the duration of said limited duration firing signal being substantially the time required to establish the ON-OFF power switching devices of said converter leg in an ON conductive state thereby reducing said forward blocking voltage condition essentially to zero.

4. In an electrical converter apparatus as claimed in claim 3 wherein said first circuit means includes a voltage difference detector circuit means operatively connected across opposite ends of said converter leg and producing a first polarity output signal in response to said forward blocking voltage condition and a second polarity output signal response to reverse blocking voltage condition across said converter leg, a comparator circuit means having a first input operatively connected to the output of said voltage difference detection circuit means and means for applying a threshold signal indicative of said forward blocking voltage condition to a second input of said comparator circuit means, said comparator circuit means providing said input signal to said first input of said second circuit means when a first output signal from said voltage difference detector circuit means satisfies a predetermined relationship with said threshold signal.

* * * * *